United States Patent
Faraj et al.

(10) Patent No.: US 11,054,685 B2
(45) Date of Patent: Jul. 6, 2021

(54) BRACKETS FOR MOUNTING A CENTER STACK MODULE IN AN INSTRUMENT PANEL

(71) Applicant: Ford Global Technologies LLC, Dearborn, MI (US)

(72) Inventors: Zen Faraj, Doreen (AU); Paul Madavanakkatt, Craigieburn (AU); Achuta Annedi, Glenroy (AU); Tien Vo, Truganina (AU)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 16/654,942

(22) Filed: Oct. 16, 2019

(65) Prior Publication Data

US 2020/0174306 A1    Jun. 4, 2020

(30) Foreign Application Priority Data

Dec. 3, 2018 (CN) .......................... 201811463733.3

(51) Int. Cl.
| | | |
|---|---|---|
| *G02F 1/1333* | (2006.01) | |
| *B60K 37/04* | (2006.01) | |
| *B60R 21/045* | (2006.01) | |

(52) U.S. Cl.
CPC ........ *G02F 1/133308* (2013.01); *B60K 37/04* (2013.01); *B60K 2370/816* (2019.05); *B60R 21/045* (2013.01); *G02F 1/133322* (2021.01)

(58) Field of Classification Search
CPC .............. G02F 1/133308; B60K 37/04; B60K 2370/816; B60K 2370/84; B60R 21/045; B60R 11/02; B60R 2011/0005; B60R 2011/0043
USPC .......................................................... 296/70
See application file for complete search history.

(56) References Cited

U.S. PATENT DOCUMENTS

| | | | |
|---|---|---|---|
| 5,064,162 A | 11/1991 | Jondelius | |
| 5,564,769 A | 10/1996 | Deneau et al. | |
| 6,196,588 B1 | 3/2001 | Sugawara | |
| 6,299,208 B1 | 10/2001 | Kasahara et al. | |
| 7,735,865 B2 * | 6/2010 | Cappabianca | ........ B60R 21/045 |
| | | | 280/752 |
| 9,927,642 B2 | 3/2018 | Larry et al. | |

(Continued)

FOREIGN PATENT DOCUMENTS

IN      03628CH2015 A      1/2017

*Primary Examiner* — Joseph D. Pape
*Assistant Examiner* — Dana D Ivey
(74) *Attorney, Agent, or Firm* — David Coppiellie; Kolitch Romano LLP (57) ABSTRACT

A bracket for mounting center stack modules in an instrument panel assembly of a vehicle is provided. The bracket comprises a first bracket half and a second bracket half, each extending substantially at a longitudinal direction of the vehicle and spaced apart laterally. Each of the first and second bracket halves comprises a first end, a second end and a body between the first end and second end. The first end is connected to a cross car beam, and the second end is connected to the center stack module. The body includes a deformable element collapsible by an impact force. Further, the first bracket half includes a first main surface and the second bracket half includes a second main surface which are substantially perpendicular to a floor of the vehicle.

19 Claims, 4 Drawing Sheets

(56) References Cited

U.S. PATENT DOCUMENTS

2008/0048425 A1\* 2/2008 Hayata .................. B60R 21/045
　　　　　　　　　　　　　　　　　　　　280/751

\* cited by examiner

BRACKETS FOR MOUNTING A CENTER STACK MODULE IN AN INSTRUMENT PANEL

CROSS-REFERENCES

This application claims the benefit under 35 U.S.C. § 119(a) of the priority of Chinese Patent Application Serial No. 201811463733.3, filed Dec. 3, 2018, the entirety of which is hereby incorporated by reference for all purposes.

FIELD

The present disclosure relates to a bracket for mounting a center stack module in an instrument panel of a vehicle, in particular, a bracket having collapsible feature while providing required stiffness.

BACKGROUND

In a vehicle, an instrument panel assembly includes an instrument panel carrier, commonly known as a cross car beam and a plurality of modules such as an audio head unit, a climate control module, display modules. The cross car beam acts as a skeleton of the instrument panel assembly and includes a center stack area forming the center of instrument panel. Various modules may be mounted in the center stack area of the cross car beam to provide an easy access to the user. The center stack module may refer to the module stacked in the center stack area of the instrument panel assembly. As more modules need to be installed in the instrument panel assembly, the mounting brackets for the center stack modules have the challenge of conflicting requirements. For example, a mounting structure that supports the center stack module is required to have sufficient stiffness. On the other hand, the mounting structure is required to be weak enough or collapsible to meet head impact requirements. Conventionally, a plastic cage structure is used to meet the regulation for the head impact. However, manufacturing plastic cages involve complex tooling, which drives higher investment cost. Further, plastic cage structure may not be able to provide sufficient rigidity to avoid squeak and rattle issues at some conditions. Thus, there is a need for a strong yet collapsible bracket to meet the conflicting requirements.

SUMMARY

According to one aspect of the present disclosure, a bracket for mounting center stack modules in an instrument panel assembly of a vehicle is provided. The bracket comprises a first bracket half and a second bracket half, each extending substantially at a longitudinal direction of the vehicle and spaced apart laterally. Each of the first and second bracket halves comprises a first end, a second end and a body between the first end and second end. The first end is connected to a cross car beam, and the second end is connected to the center stack module. The body includes a deformable element collapsible by an impact force. Further, the first bracket half includes a first main surface and the second bracket half includes a second main surface. The first main surface and the second main surface are substantially perpendicular to a floor of the vehicle.

In one embodiment, each of the first and second bracket halves is made from mild steel.

In another embodiment, the deformable element includes a raised portion protruding from the first main surface of the first bracket half and the second main surface of the second bracket half.

In another embodiment, the deformable element includes at least one aperture configured to further weaken the deformable element.

In another embodiment, the deformable element is formed by a metal plate and includes a V-shaped profile.

In another embodiment, the deformable element includes an accordion portion.

In another embodiment, the body includes a connection portion to be coupled to a lower unit of the center stack module. Further, the deformable element is disposed between the first end and the connection portion.

In another embodiment, each of the first and second bracket halves includes an upper arm extended at the longitudinal direction of the vehicle. The upper arm is branched out from the connection portion at the first end and configured to mount an upper unit for the center stack module.

In another embodiment, the upper arm includes a second deformable element collapsible at the longitudinal direction.

In another embodiment, the connection portion includes an elongated rail for coupling with the lower unit of the center stack module.

In another embodiment, the connection portion comprises a flange at the second end. The flange is to be connected to the center stack module.

In another embodiment, a cross bar is disposed between and connected to the second end of the first and second bracket halves to form a preassemble module.

According to another aspect of the present disclosure, an instrument panel assembly of a vehicle is provided. The instrument panel assembly comprises a cross car beam and a bracket. The bracket is made from mild steel and includes a first bracket half and a second bracket half. Each of the first bracket half and second bracket half extends away from the cross car beam in a longitudinal direction of the vehicle. Each of the first and second bracket halves comprises a first end, a second end and a body between the first and second ends. The first end is connected to the cross car beam, and the second end is connected to a lower unit of a center stack module. The body includes a deformable element deformable upon force exerted on the vehicle exceeds a threshold. Further, a first main surface of the first bracket half and a second main surface of the second bracket half are substantially perpendicular to a floor of the vehicle and substantially parallel each other.

In another embodiment, the deformable element is disposed adjacent to the first end.

In another embodiment, the first main surface of the first bracket half and the second main surface of the second bracket half contact or couple with a first side surface and a second side surface of the lower unit respectively. Further, the first main surface and the second main surface cover about one third to one half of an area of the first side surface and the second side surface respectively.

In another embodiment, the center stack module is a multimedia module and the lower unit is an electronic control unit.

In another embodiment, the multimedia module further includes an upper unit, and the upper unit is a display screen. Each of the first and second bracket halves includes an upper arm branched from the body and extended from the first end substantially at the longitudinal direction. The upper arm is configured to mount the display screen.

In another embodiment, the deformable element has a V-shaped profile.

In another embodiment, the center stack module is a multimedia module. Further, the first bracket half and the second bracket half include a guide rail and a flange. The guide rail extends at the longitudinal direction for mounting a lower unit of the multimedia module. The flange extends in a lateral direction of the vehicle for coupling with the center stack module and other components of the instrument panel.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed brackets for mounting center stack module in an instrument panel of a vehicle will become better understood through review of the following detailed description in conjunction with the figures. The detailed description and figures provide merely examples of the various inventions described herein. The person skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various brackets for mounting center stack module in the instrument panel assembly of the vehicle are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

An instrument panel assembly of a vehicle may include a plurality of components such as a glove box, a knee bolster, a fuel gauge, an audio head unit, a climate control module, display modules which are assembled in the instrument panel carrier. The instrument panel carrier may be made of rigid material such as hard plastic and include plurality of openings at various position to accommodate the different components. The surface of the instrument panel carrier is typically covered with a soft panel to improve aesthetic appearance of the instrument panel. The instrument panel carrier is typically mounted on a cross car beam of the vehicle and attached to mounting brackets. The cross car beam is an elongated structure that extends laterally between the A-pillar of the vehicle at the juncture of an engine compartment and a passenger compartment.

The cross car beam includes a center stack area located approximately at the middle portion of the instrument panel for housing the plurality of the modules such as multimedia modules, climate control modules. The center stack module becomes heavier with increasing number of units. The center stack modules may be a single unit or multiple units. The center stack area is an area of the instrument panel assembly that is prone to receive an impact force from the occupants (a driver and/or passenger) during events such as crash. Therefore, the mounting structure that connects the center stack modules is required to have sufficient stiffness, yet collapsible to absorb impact energy upon application of certain impact force on the instrument panel assembly.

Figure 1:
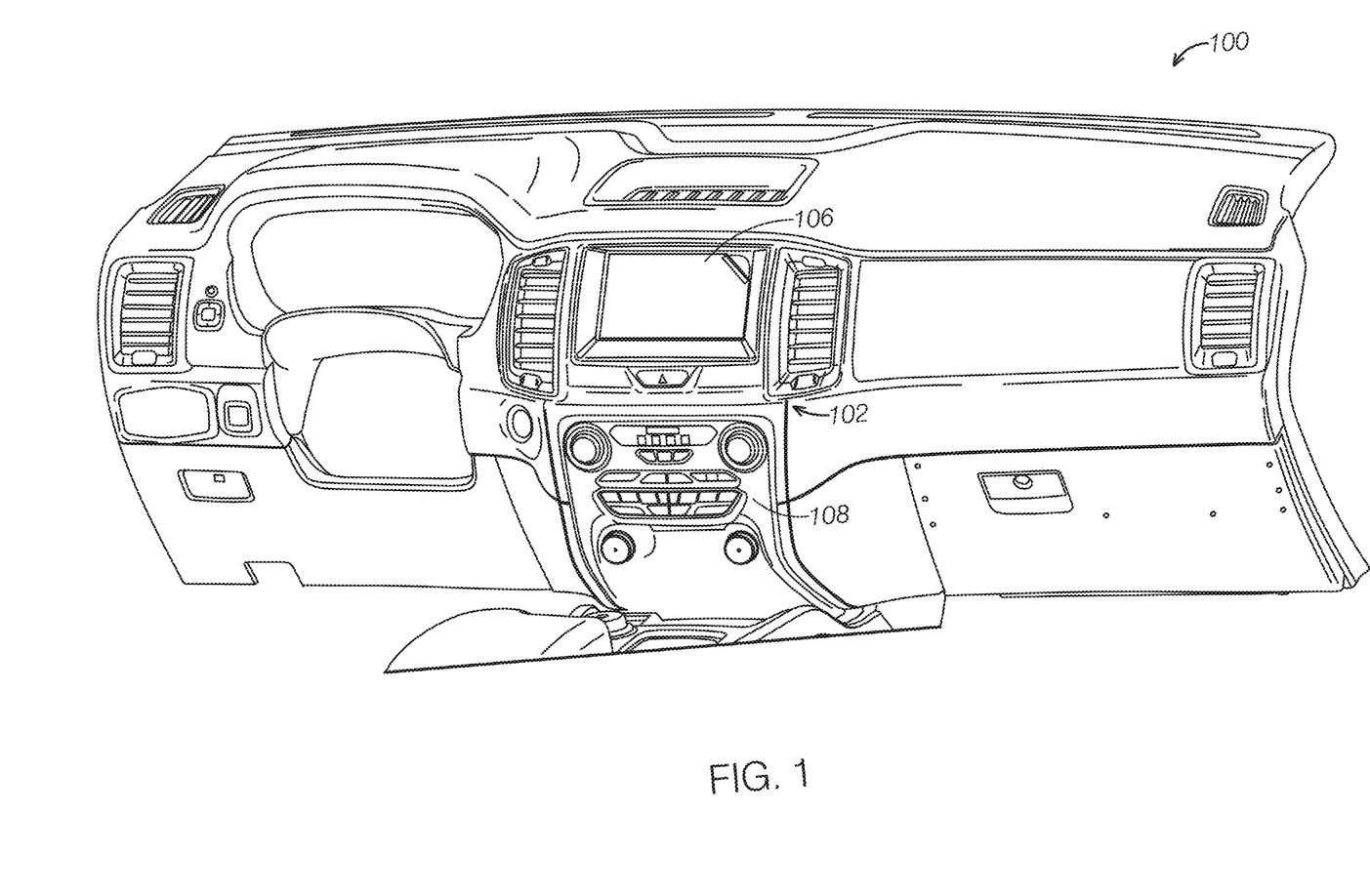
FIG. 1 is a perspective view of an instrument panel of a vehicle according to one embodiment of the present disclosure.
Figure 2:
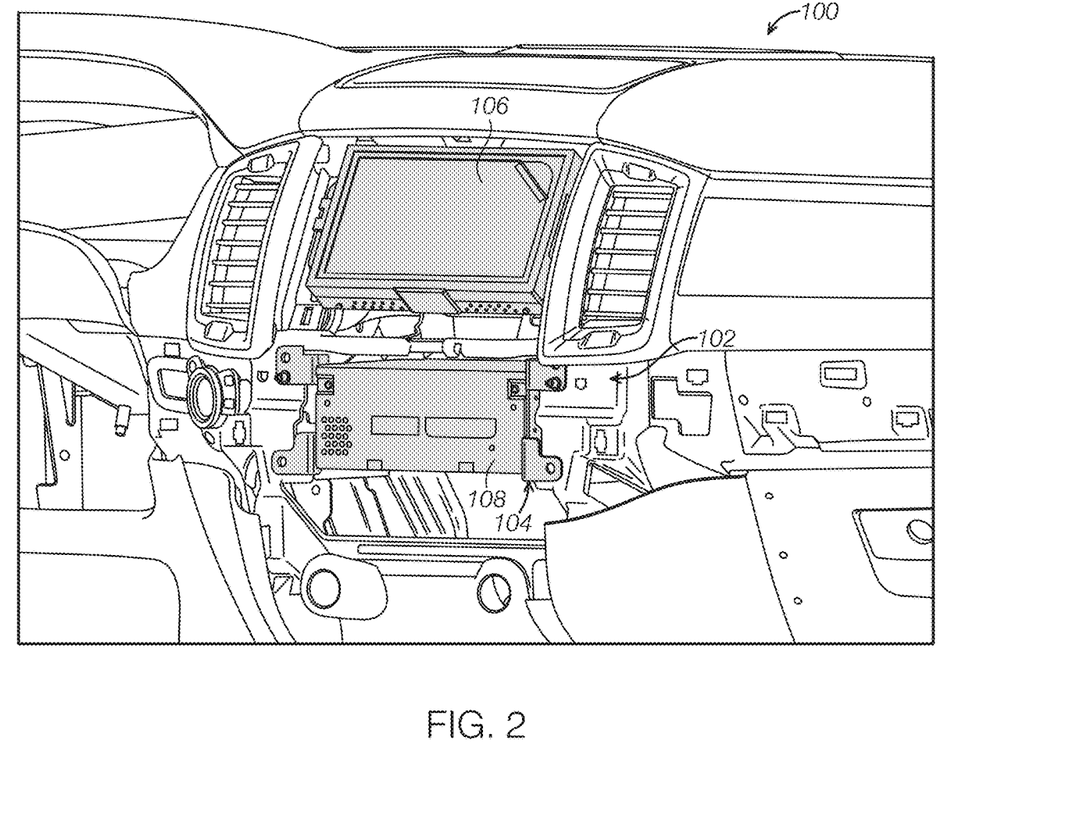
FIG. 2 is a perspective view of the instrument panel in FIG. 1, illustrating a bracket for mounting a center stack module according to one embodiment of the present disclosure.

Referring to FIGS. 1 and 2, FIG. 1 is a perspective view of an instrument panel 100 of a vehicle according to one embodiment of the present disclosure. FIG. 2 is perspective view of the instrument panel, illustrating a center stack module 102 mounted on a bracket 104. The vehicle includes a cross car beam (not shown), the bracket 104 mounted on the cross car beam and the center stack module 102. The cross car beam extends laterally between opposite sides of the vehicle. The center stack module 102 may be disposed on an area including a center line in the lateral direction of the vehicle or disposed on a center area and may include multimedia units. In an embodiment, the multimedia unit may include an upper unit 106 and a lower unit 108. The upper unit 106 may be a display unit and the lower unit 108 may be an electronic control panel unit or audio head unit. It should be appreciated that the multimedia unit may be configured as a single unit having plurality of modules stacked upon each other.

Figure 3:
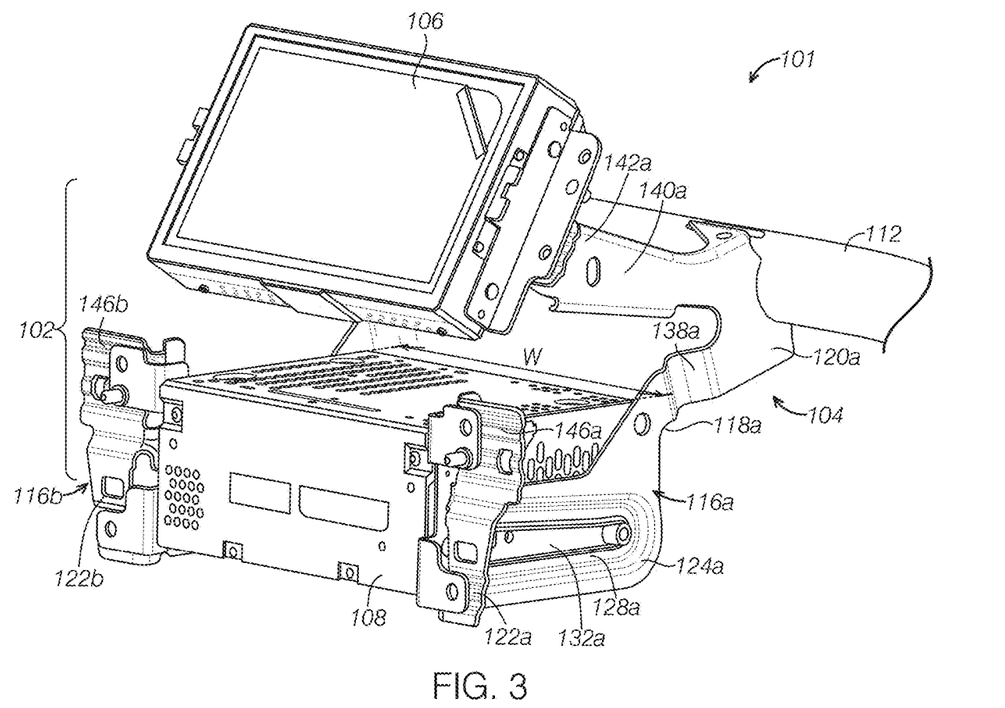
FIG. 3 shows a perspective views of an instrument assembly, illustrating a center stack module and a bracket for the mounting center stack module according to one embodiment of the present disclosure.
Figure 4:
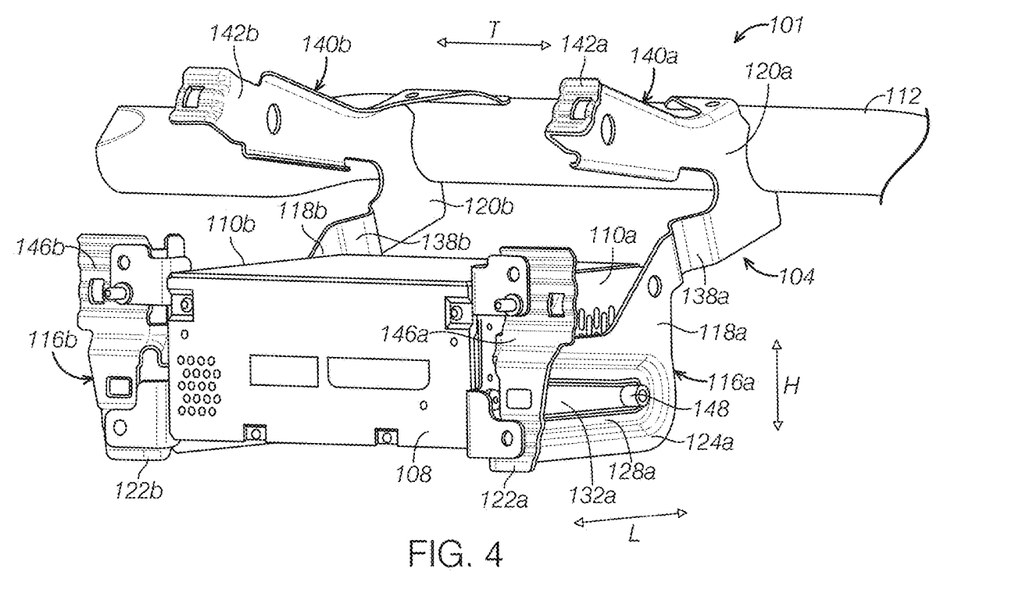
FIG. 4 shows a perspective views of the bracket in FIG. 3, illustrating a lower unit of center stack module secured to the bracket.
Figure 5:
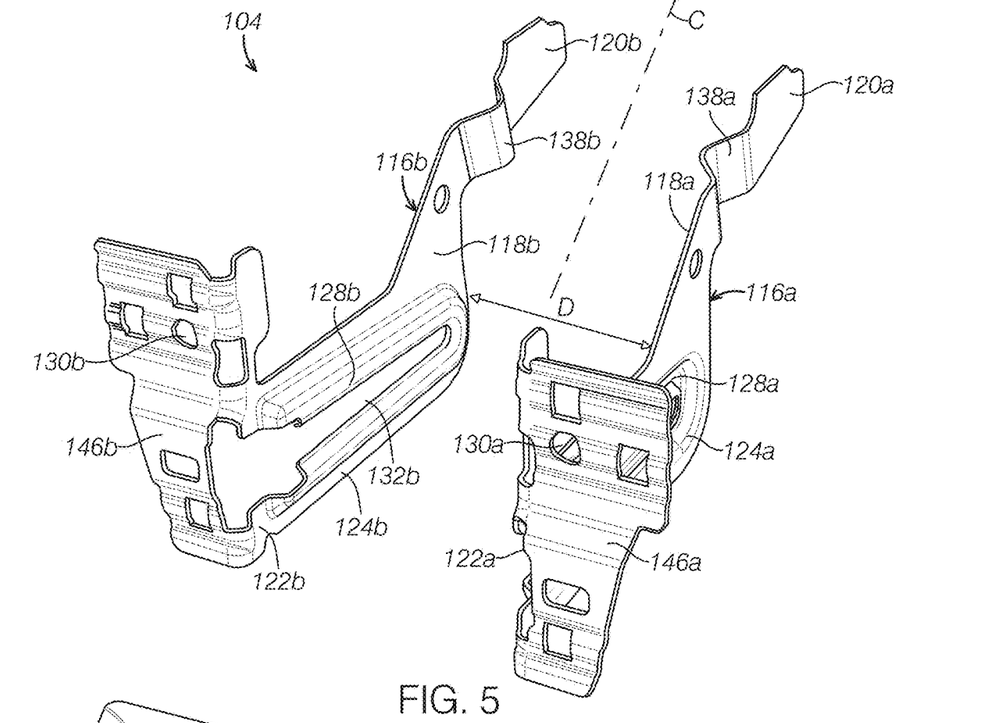
FIG. 5 is a partial bracket in FIG. 3, illustrating a first bracket half and a second bracket half of the bracket.

Referring to FIGS. 3, 4 and 5, FIG. 3 shows an instrument panel assembly 101, illustrating a bracket 104 attached to a cross bar beam 112 and the center stack module 102 connected to the bracket 104 according to one embodiment of the present disclosure. FIG. 4 shows the instrument assembly 101 in FIG. 3, illustrating a lower unit 108 of center stack module 102 secured to the bracket 104. FIG. 5 shows partial bracket 104, illustrating a first bracket half 116a and a second bracket half 116b of the bracket 104 in FIG. 4. As shown in FIGS. 3-4, the center stack module 102 is coupled to the cross car beam 112 of the vehicle via the bracket 104. The cross car beam 112 is a rigid elongated beam extending between the A-pillar of the vehicle at the juncture of an engine compartment and the passenger compartment. In an embodiment, the instrument panel carrier is reinforced with the cross car beam 112. For example, the instrument panel carrier is mounted on the cross car beam 112. In some embodiments, the bracket 104 includes a first bracket half 116a and a second bracket half 116b spaced apart from the first bracket half 116a at a lateral direction T of the vehicle. The first and second bracket halves 116a, 116b extend substantially at a longitudinal direction L of the vehicle. In some embodiments, the first and second bracket halves 116a, 116b are made of a rigid metallic material. In one example, the first and second bracket halves 116a, 116b are made of a cold rolled mild steel. The metal bracket can provide sufficient stiffness and strength to support the center stack module 102.

The first bracket half 116a may include a body 118a between a first end 120a and a second end 122a. Similarly, the second bracket half 116b may include a body 118b between a first end 120b and a second end 122b. The first ends 120a, 120b are connected to the cross car beam 112 and a second end 122b, 122b are configured to connect the center stack module 102. The bodies 118a, 118b may include connection portions 124a, 124b which are spaced apart to define a space corresponding to a dimension of the center stack module. For example, with further reference to FIG. 5, a distance D between the first bracket half 116a and the second bracket half 116b is greater than a width of a lower unit 108 of the center stack module 104 for accommodating the lower unit 108. In an embodiment, the first bracket half 116a and the second bracket half 116a are symmetric to a central line C of the bracket along the longitudinal direction.

Referring to FIGS. 3 and 4, the first end 120a of the first bracket half 116a and the first end 120b of the second half 116b may be connected to the cross car beam 112 via any appropriate approaches. For example, the first end 120a of the first bracket half 116a and the first end 120b of the second half 116b may be attached to the cross car beam 112 by welding as both are made from metallic material. The second ends 122a, 122b are configured to connect the center stack module 102. In some embodiments, the second ends 122a of the first bracket half 116a and the second end 122b of second bracket half 116b may be detachably connected to a first side surface 110a and a second side surface 110b of the lower unit 108 of the center stack module 102, respectively.

In some embodiments, the second end 122a, 122b of the bracket halves 116a, 116b may include flanges 146a, 146b respectively for coupling with the lower unit 108 of the center stack module 102. The flanges 146a, 146b may form an angle with first and second main surfaces 128a, 128b of the connection portions 124a, 124b (e.g., the angle of substantially 90 degrees) and includes mounting holes 130a, 130b, respectively. In one embodiment, the flange 146a, 146b extend at the lateral direction T and away from the lower unit 108. The lower unit 108 of the center stack module 102 may include retaining features which are connected to the flange 146a, 146b via fasteners. The flange 146a, 146b may be an integral component of the first and second bracket halves 116a, 116b. In some embodiments, the flange 146a, 146b may be a separate component connected to the second end 122a, 122b of bracket halves 116a, 116b. The lower unit 108 of center stack module 102 may be detachably connected to the flange 146 via fasteners. The flange 146a, 146b may extend in a height direction H of the vehicle for coupling with center stack module (102) and other components of the instrument panel assembly. In some embodiments, the flange 146a, 146b extend along the entire height of the lower unit 108 of the center stack module 102 or may have a length greater than the height of the lower unit 108.

Continuing with FIGS. 3-4 and with further reference to FIG. 5, in some embodiments, the first main surfaces 128a of the connection portion 124a and the second main surface 128b of the connection portion 124b may be parallel each other and disposed in a way such that the they abut against two sides 110a, 110b of the lower unit 108 of the center stack module 102, respectively. The first main surface 128a and the second main surface 128b may be substantially perpendicular to a floor of the vehicle. In some embodiments, the first main surface 128a and second main surface 128b may contact the first side surface 110a and second side surface 110b of the lower unit 108, respectively. In an embodiment, the first main surface 128a and second main surface 128b cover about one third to one half of an area of the first side surface 110a and the second side surface 110b, respectively. The first main surface 128a and second main surface 128b aid in supporting the weight of the lower unit via connection.

In some embodiments, the connection portions 124a, 124b may respectively include guide rails 132a, 132b extending along a longitudinal direction L of the vehicle for mounting a lower unit 108 of the center stack module 102. The guide rail 132a, 132b may be elongated grooves configured to receive fasteners that connect the center stack module 102 to the bracket 104. In an embodiment, the lower unit 108 may include the retaining features 148 such as screw bolts projecting out of the side surfaces 110a, 110b and configured to pass through the guide rail 132a, 132b. Screwed nuts may be used to connect the screw bolts. The guide rail 132a, 132b can facilitate positioning of the center stack module before connecting it with the second end 122.

The first and second bracket halves 116a, 116b may respectively include deformable elements 138a, 138b configured to collapse when a force exerted on the bracket 104 exceeds a predetermined threshold. The deformable elements 138a, 138b are weakened portions to be collapsed to absorb the impact energy. For example, the deformable element 138a, 138b may be configured to collapse upon an impact of a force on the instrumental panel or the center stack module 102. In some embodiments, the deformable elements 138a, 138b may be disposed between the first ends 120a, 120b and the connection portions 124a, 124b. In an embodiment, the deformable element 138a of the first bracket half 116a may be fabricated from a plate and include a raised portion protruding from a plane parallel to the first main surface 128a of the main panel 124a or parallel to the first main surface 128a. Similarly, the deformable element 138b of the second bracket half 116b includes a raised portion protruding a plane parallel to the second main surface 128b of the main panel 124b or parallel to the second main surface 128b of the second panel 124b. The raised portions may protrude toward each other to save space in the instrument panel. In another embodiment, the deformable element 138a, 138b include a V-shaped profile that has a raised portion in a direction perpendicular to the impact direction. In another embodiment, the deformable elements 138a, 138b include at least one aperture configured to further weaken the deformable element. In some embodiments, the deformable element 138a, 138b include an accordion portion. That is, the deformable element may include more than one raised portion which are formed by folding the plate or the deformable element consists of at least two V-shaped profiles. The deformable elements 138a, 138b have reduced stiffness such that they can collapse upon an application of impact force to absorb energy.

Referring to FIG. 3-5, the bracket 104 includes upper arms 140a, 140b to support the upper unit 108 of the center stack modules 102. The bodies 118a, 118b and the upper arms 140a, 140b are branched from the first end 120a, 120b. The upper arms 140a, 140b extend general in longitudinal direction L of the vehicle. The upper arms 140a, 140b have second ends 142a, 142b configured to connect the upper unit 106 of the center stack module 102.

Figure 6:
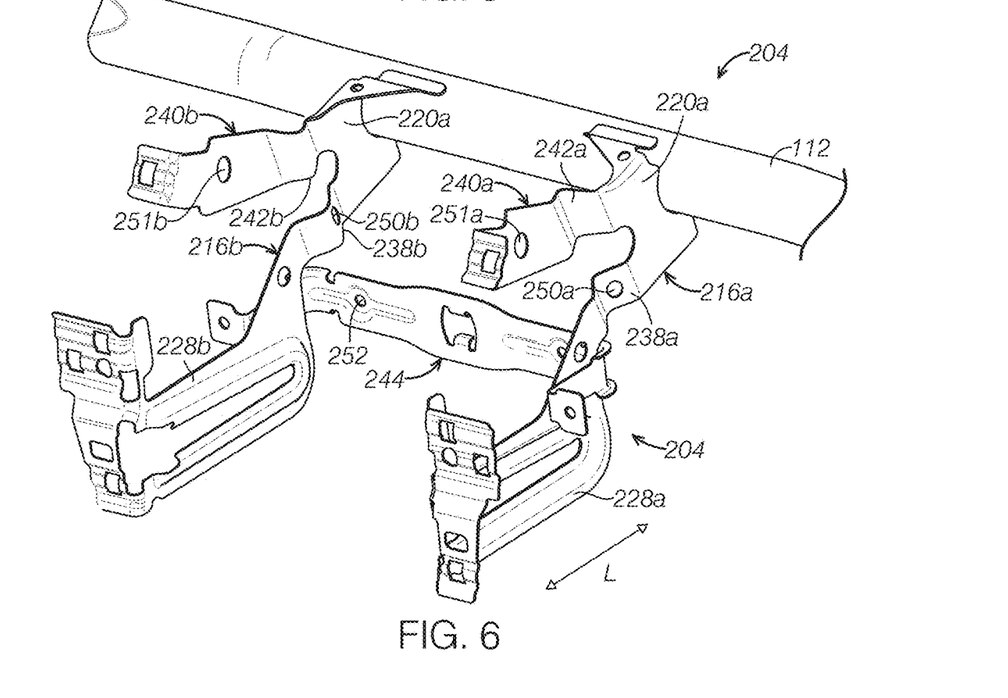
FIG. 6 is a perspective view of a bracket for mounting a center stack module in the instrument panel according to another embodiment of the present disclosure.

Referring to FIG. 6, FIG. 6 is a perspective view of an instrument panel assembly 201, illustrating a bracket 204 for mounting center stack module 102 in the instrument panel according to another embodiment of the present disclosure. For the sake of brevity, in this example, the elements and features similar to those previously shown and described will not be described in much further detail. In other words, differences between the present embodiment and the embodiment of FIGS. 3-5 will be mainly described. The bracket 204 comprises a first bracket half 216a and a second bracket half 216b which are connected to the cross bar beam 112. The first and second bracket halves 216a, 216b are made from metallic material. The first and second bracket halves 216a, 216b extend substantially along a longitudinal direction L of the vehicle and include first deformable elements 238a, 238b, respectively. The first deformable element 238a, 238b are collapsible upon exertion of the impact force on the bracket 204 or the instrument panel. In some embodiments, the first deformable elements 238a, 238b are disposed in areas closer to first ends 220a, 220b of the first and second bracket halves 216a, 216b. In the depicted embodiment, the first deformable elements 238a, 238b include raised portions protruding from a plane substantially parallel to main surfaces 228a, 228b of the first and second bracket halves 216a, 216b. The first deformable elements 238a, 238b are made of plates which are bended to form the raised portions. In some embodiments, the first deformable elements 238a, 238b include holes 250a, 250b respectively to further weaken the deformable elements 238a, 238b.

In some embodiments, the first and second bracket halves 216a, 216b may further include upper arms 240a, 240b configured to connect an upper unit of the center stack module. In some embodiments, the upper arms 240a, 240b include second deformable elements 242a, 242b. The second deformable element 242a, 242b are collapsible upon exertion of the impact force on the bracket 204. In one embodiment, the second deformable element 242a, 242b may include raised portions. In another embodiment, the second deformable elements 242a, 242b include at least one aperture 251a, 251b configured to further weaken the deformable element. In another embodiment, the second deformable element includes an accordion portion. That is, the second deformable element may include more than one raised portion. In some embodiment, the second deformable elements 242a, 242b may have a structure similar to the first deformable elements 238a, 238b. In some embodiments, the second deformable elements 242a, 242b may have a structure different from the first deformable elements 238a, 238b depending upon weights of the upper unit and the lower unit of the center stack module.

In the depicted embodiment, a cross bar 244 is disposed between and connected to the first bracket half 216a and the second bracket half 216b. In some embodiments, the cross bar 244 may be an elongated plate that extends between, and connected to the first and second bracket halves 216a, 216b. In some embodiments, the cross bar 244 may be connected to the bracket halves 216a, 216b to form a preassembled bracket module before being attached to the cross bar beam 112. In some embodiments, the cross bar 244 may be detachably connected to the bracket halves 216a, 216b. The cross bar 244 may further include retaining features 252 (e.g., a retaining hole) for coupling with a rear side of the center stack modules 102. The cross bar 244 may be made from metallic material and connected to the first and second bracket halves 216a, 216b via welding. It should be appreciated that the cross bar 244 may be made from other materials such as plastic and connected to the first and second bracket halves 216a, 216b via an appropriated approached such as bolt/nut connection.

The brackets of present disclosure provide sufficient stiffness to support the weights of the center stack module as the brackets are made from metallic material such as mild steel. The deformable elements of the brackets can absorb the energy required to meet the head impact requirement while sufficient stiffness is provided. Further, the metal brackets provide improved durability of the instrument panel assembly over the life of the vehicle, withstanding variation in temperature as well as road vibration load inputs. Furthermore, the cost of manufacturing the bracket may be reduced as the metal tooling for the brackets is less complex and costs less compared to the tooling for the plastic brackets.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and nonobvious combinations and subcombinations of the various elements, features, functions and/or properties disclosed above and inherent to those skilled in the art pertaining to such inventions.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A bracket for mounting a center stack module to an instrument panel assembly of a vehicle, comprising:
   a first bracket half and a second bracket half extending substantially at a longitudinal direction of the vehicle and spaced apart laterally, each of the first and second bracket halves including:
   a first end to be connected to a cross car beam,
   a second end to be connected to the center stack module, and
   a body between the first and second ends and including a deformable element collapsible by an impact force,
   wherein a first main surface of the first bracket half and a second main surface of the second bracket half are substantially perpendicular to a floor of the vehicle; and
   wherein the body includes a connection portion to be coupled to a lower unit of the center stack module, the connection portion is formed by a plate and the deformable element has a V-shaped profile.

2. The bracket of claim 1, wherein the first and the second bracket halves are made from mild steel.

3. The bracket of claim 2, wherein the deformable element includes a raised portion protruding from the first main surface of the first bracket half and the second main surface of the second bracket half.

4. The bracket of claim 3, wherein the deformable element includes at least one aperture configured to further weaken the deformed element.

5. The bracket of claim 2, wherein the first bracket half and the second bracket half are symmetric to a central line of the bracket along the longitudinal direction.

6. The bracket of claim 2, wherein the deformable element is disposed between the first end and the connection portion.

7. The bracket of claim 6, wherein each of the first and second bracket halves includes an upper arm extended at the longitudinal direction of the vehicle, branched out from the connection portion at the first end and configured to mount an upper unit of the center stack module.

8. The bracket of claim 7, wherein the upper arm includes a second deformable element collapsible at the longitudinal direction.

9. The bracket of claim 7, wherein the connection portion includes an elongated rail for coupling with the lower unit of the center stack module.

10. The bracket of claim 1, further comprising a flange at the second end and configured to be connected to the center stack module and other components of the instrument panel assembly.

11. The bracket of claim 1, further comprising a cross bar disposed between and connected to the first and second bracket halves to form a preassembled module.

12. An instrument panel assembly of a vehicle, comprising:
- a cross car beam;
- a bracket including:
- a first bracket half and a second bracket half extending away from the cross car beam in a longitudinal direction of the vehicle, each of the first and second bracket halves comprising:
- a first end connected to the cross car beam,
- a second end connected to a lower unit of a center stack module, and
- a body between the first and second ends, wherein the body includes a deformable element deformable when a force exerted on the vehicle exceeds a threshold, and
- wherein the bracket is made from mild steel; and
- wherein the center stack module includes an upper unit, each of the first and second bracket halves includes an upper arm branched from the body, extended from the first end substantially at the longitudinal direction and configured to mount the upper unit.

13. The instrument panel assembly of claim 12, wherein a first main surface of the first bracket half and a second main surface of the second bracket half face each other and are substantially perpendicular to a floor of the vehicle and substantially parallel each other, and wherein the deformable element is disposed adjacent to the first end.

14. The instrument panel assembly of claim 13, wherein the first main surface of the first bracket half and the second main surface of the second bracket half contact or couple with a first side and a second side of the lower unit, respectively, and wherein the first main surface and the second main surface cover about one third to one half of an area of the first side and the second side, respectively.

15. The instrument panel assembly of claim 14, wherein the center stack module is a multimedia module and the lower unit is an electronic control panel unit.

16. The instrument panel assembly of claim 15, wherein the upper unit is a display screen.

17. The instrument panel assembly of claim 15, wherein the deformable element has a V-shape.

18. The instrument panel assembly of claim 12, wherein the center stack module is a multimedia module, the first bracket half and the second bracket half include a guide rail extending in the longitudinal direction for mounting the lower unit of the multimedia module, and a flange extending in a lateral direction of the vehicle for coupling with the lower unit and other components of the instrument panel assembly.

19. A bracket for mounting a center stack module to an instrument panel assembly of a vehicle, comprising:
- a first bracket half and a second bracket half extending substantially at a longitudinal direction of the vehicle and spaced apart laterally, each of the first and second bracket halves including:
- a first end to be connected to a cross car beam,
- a second end to be connected to the center stack module, and
- a body between the first and second ends and including a deformable element collapsible by an impact force,
- wherein a first main surface of the first bracket half and a second main surface of the second bracket half are substantially perpendicular to a floor of the vehicle; and
- wherein the deformable element includes an accordion portion.

* * * * *